(12) United States Patent
Murray

(10) Patent No.: US 10,227,798 B2
(45) Date of Patent: Mar. 12, 2019

(54) TAILGATE HANDLE

(71) Applicant: Ford Global Technologies, LLC, Dearborn, MI (US)

(72) Inventor: Andrew John Murray, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 913 days.

(21) Appl. No.: 14/247,583

(22) Filed: Apr. 8, 2014

(65) Prior Publication Data

US 2014/0319853 A1 Oct. 30, 2014

(30) Foreign Application Priority Data

Apr. 30, 2013 (GB) .................................. 1307760.7

(51) Int. Cl.
| | |
|---|---|
| *E05B 85/10* | (2014.01) |
| *E05B 81/00* | (2014.01) |
| *E05B 83/18* | (2014.01) |
| *B60J 5/10* | (2006.01) |

(52) U.S. Cl.
CPC .............. *E05B 85/10* (2013.01); *E05B 81/00* (2013.01); *E05B 83/18* (2013.01); *B60J 5/102* (2013.01); *Y10T 292/57* (2015.04)

(58) Field of Classification Search
CPC .... Y10T 292/57; Y10S 292/42; Y10S 292/43; Y10S 292/63; E05B 1/04; E05B 77/34; E05B 79/06; E05B 83/18; E05B 85/10; E05B 85/103
USPC ......... 292/336.3, DIG. 42, DIG. 43, DIG. 63
See application file for complete search history.

(56) References Cited

U.S. PATENT DOCUMENTS

| | | | | |
|---|---|---|---|---|
| 4,090,379 | A * | 5/1978 | Lehner | E05B 77/34 292/251.5 |
| 5,560,659 | A * | 10/1996 | Dault | E05B 13/005 292/336.3 |
| 5,904,385 | A * | 5/1999 | Linder | E05B 17/185 292/336.3 |
| 6,062,614 | A * | 5/2000 | Petzold | E05B 85/14 292/336.3 |
| 6,582,006 | B1 * | 6/2003 | Burch | B60R 13/105 296/100.06 |

(Continued)

FOREIGN PATENT DOCUMENTS

| | | | | |
|---|---|---|---|---|
| DE | 2936193 | A1 * | 3/1981 | ............. E05B 85/10 |
| DE | 3939768 | A1 * | 6/1991 | ........... E05B 1/0015 |

(Continued)

OTHER PUBLICATIONS

Search report for British patent application No. GB1307760.7 dated Oct. 31, 2013.

*Primary Examiner* — Christine M Mills
(74) *Attorney, Agent, or Firm* — Jason Rogers; Vichit Chea; King & Schickli, PLLC

(57) ABSTRACT

A handle assembly for opening and closing a vehicle door wherein the handle assembly includes: a recess in an exterior surface of the vehicle door; a cover over the recess wherein the cover is coupled to the vehicle door and is moveable between an open position and a closed position; and a handle member coupled to the cover and retained in the recess when the cover is in the closed position and released from the recess when the cover is in the open position.

7 Claims, 3 Drawing Sheets

(56) References Cited

U.S. PATENT DOCUMENTS

| | | | |
|---|---|---|---|
| 7,062,945 B2 * | 6/2006 | Saitoh | B60R 25/246 49/460 |
| 7,108,301 B2 * | 9/2006 | Louvel | E05B 81/78 292/201 |
| 7,387,321 B2 * | 6/2008 | Tanaka | E05B 77/04 292/336.3 |
| 8,443,553 B1 * | 5/2013 | Polewarczyk | E05B 81/77 16/412 |
| 2001/0005084 A1 * | 6/2001 | Ponziani | B60S 1/04 296/56 |
| 2003/0009855 A1 * | 1/2003 | Budzynski | E05B 81/78 16/443 |
| 2009/0079207 A1 * | 3/2009 | Manzhura | E05B 13/001 292/336.3 |
| 2013/0170241 A1 * | 7/2013 | Lesueur | E05B 77/06 362/501 |
| 2015/0013403 A1 * | 1/2015 | Fujiwara | E05B 81/78 70/263 |

FOREIGN PATENT DOCUMENTS

| | | | | |
|---|---|---|---|---|
| DE | 4033622 A1 * | 4/1992 | | E05B 83/24 |
| DE | 4305094 C1 * | 6/1994 | | B62D 25/12 |
| DE | 19740827 A1 * | 3/1999 | | E05B 85/10 |
| DE | 19847212 A1 * | 4/2000 | | E05B 85/14 |
| DE | 19942730 A1 * | 3/2001 | | B62D 25/12 |
| DE | 10044902 A1 * | 4/2002 | | E05B 13/001 |
| DE | 10134993 A1 * | 2/2003 | | E05B 1/76 |
| DE | 102005040761 A1 * | 3/2007 | | E05B 1/76 |
| DE | 102006027473 A1 * | 12/2007 | | E05B 1/76 |
| DE | 102009016219 A1 * | 10/2010 | | B60J 5/101 |
| EP | 0072537 A1 * | 2/1983 | | E05B 85/18 |
| FR | 2744754 A1 * | 8/1997 | | E05B 1/0015 |
| FR | 2840341 A1 * | 12/2003 | | E05B 85/107 |
| GB | 1120527 A * | 7/1968 | | E05B 85/14 |
| JP | S58222261 A * | 12/1983 | | |
| JP | S59102765 U * | 7/1984 | | |

\* cited by examiner

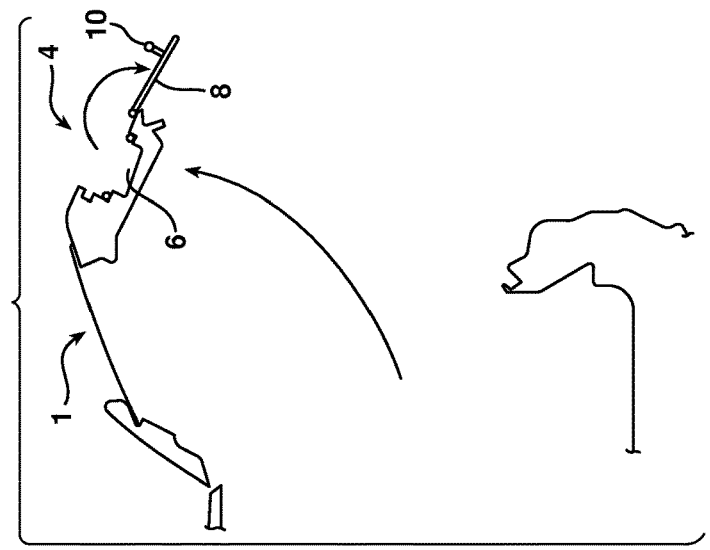
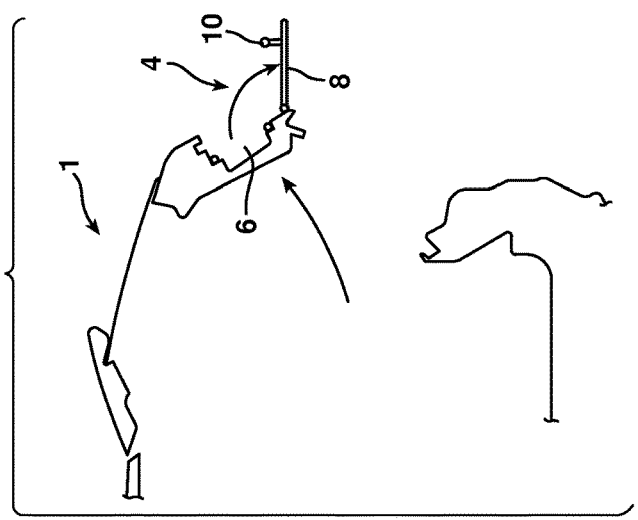
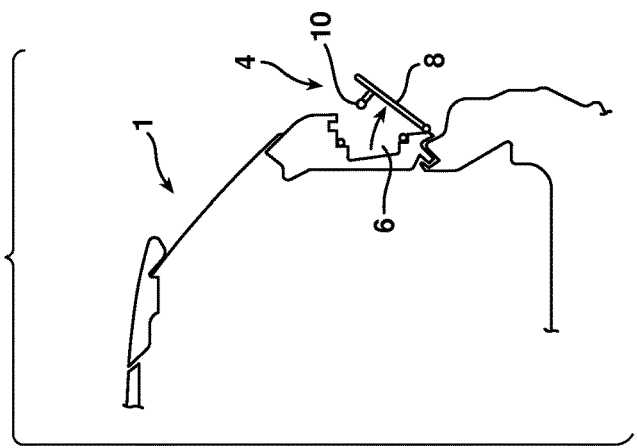

TAILGATE HANDLE

TECHNICAL FIELD

This invention relates to a handle assembly for a vehicle door, the handle assembly comprising a handle member that is releasable from a covered recess in an exterior surface of the vehicle door.

BACKGROUND

The door of a vehicle is usually opened and closed by way of a handle mounted to the exterior of the vehicle door. Since such handles are exposed to the environment external to the vehicle, they are prone to becoming contaminated with environmental pollutants, such as dirt and dust. The handle on a tailgate of the vehicle may be particularly susceptible to the build-up of pollutants. Users of the tailgate may therefore need to touch a dirty handle in order to open or close the tailgate of the vehicle.

Constraints imposed on the vehicle's styling often mean that the door handle has restricted functionality. Moreover, the handle used to open the tailgate of the vehicle is often not configured to assist the user in closing the tailgate. Besides, the tailgate handle is often inaccessible to the user once the tailgate is in the fully-open, overhead position.

It is known to provide an addition handle on the interior surface of the tailgate to assist the user in closing the tailgate. However, such interior handles may still be difficult to reach and may require the user to switch their grip back to the exterior handle to complete the action of closing the tailgate.

Whilst interior handles may be protected from environmental pollutants and therefore remain clean, the interior handle provides no means of assisting the user in opening the tailgate.

It is seen as advantageous, therefore, to provide a handle that is protected from environmental pollutants and permits the user to open and close the tailgate of a vehicle using a single motion.

SUMMARY

According to a first aspect of the present invention there is provided a handle assembly for opening and closing a vehicle door wherein the handle assembly comprises: a recess in an exterior surface of the vehicle door; a cover over the recess wherein the cover is coupled to the vehicle door and is moveable between an open position and a closed position; and a handle member coupled to the cover that is retained in the recess when the cover is in the closed position and that is released from the recess when the cover is in the open position.

When the cover is in the closed position, the handle member may be situated in the recess for the purpose of protecting the handle from environmental pollutants. When the cover is in the open position, the handle member may be accessible for the purpose of opening and closing the vehicle door.

The handle member may be pivotably coupled to the cover. The handle member may be slidably coupled to the cover. The handle member may pivot or slide by a selectable/adjustable degree. The handle member may comprise a rotatable sleeve.

The cover may be pivotably coupled to the vehicle door. The cover may be slidably coupled to the vehicle door. The cover may be coupled to the exterior surface of the vehicle door. The cover may pivot or slide by a selectable/adjustable degree.

The handle assembly may further comprise a seal between the exterior surface of the vehicle door and the cover.

The cover may be a vehicle registration plate.

The cover may be actuated by a motor. The cover may be actuated by a biasing mechanism.

The motor or the biasing mechanism may be activated remotely.

The handle member may be configured to de-latch the vehicle door. The handle member may comprise a switch.

According to another aspect of the present invention there is provided a method of opening and closing a vehicle door, the method comprising: opening a cover over a recess in a vehicle door thereby releasing a handle member coupled to the cover from the recess; opening the vehicle door by virtue of the handle member; closing the vehicle door by virtue of the handle member; closing the cover thereby retaining the handle member in the recess.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

For a better understanding of the present disclosure, and to show more clearly how it may be carried into effect, reference will now be made, by way of example, to the accompanying drawings, in which:

FIG. 2A-2C are schematic views of the handle assembly in successive stages of opening.

Reference will now be made in detail to the present preferred embodiment of the invention, examples of which are illustrated in the accompanying drawings.

DETAILED DESCRIPTION

Figure 1:
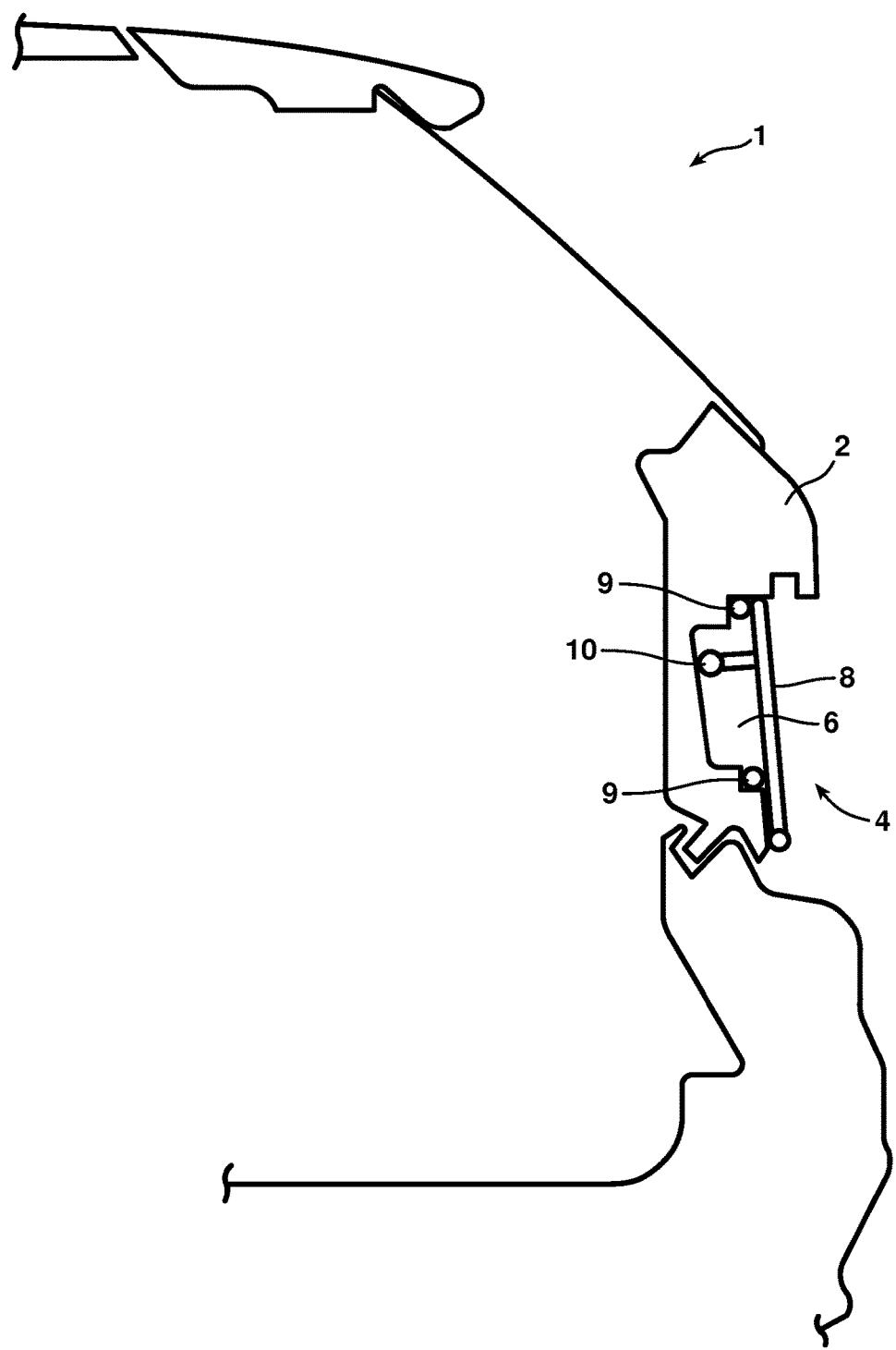
FIG. 1 is a schematic view of a vehicle tailgate having a handle.

A vehicle 1 having a tailgate 2 and a handle assembly 4 in accordance with the present invention is shown in FIG. 1. The handle assembly 4 comprises a recess 6 in an exterior surface of the tailgate 2. The handle assembly 4 comprises a cover 8 over the recess 6. The cover 8 is configured to protect the recess from the ingress of environmental pollutants. A seal 9 may be provided between the cover 8 and the recess 6.

The cover 8 is moveably coupled to the exterior surface of the tailgate 2 and is movable between an open position and a closed position. In the example shown in FIGS. 1 and 2A-C, the cover 8 is coupled by means of a hinge to the tailgate 2. However, the cover 8 may be slidably coupled or be coupled by any other appropriate means.

The handle assembly 4 comprises a handle member 10 that is coupled to the cover 8. In the embodiment shown in FIGS. 1 and 2A-C, the handle member 10 is fixed to the cover 8. However, the handle member 10 may be pivotably/slidably coupled or be coupled by any other appropriate means. The handle member may comprise a rotatable sleeve, which aids the user in not having to change their grip.

The handle member 10 is retained in the recess when the cover is in the closed position and released from the recess when the cover is in the open position FIG. 1 depicts the cover 8 in the closed position. The handle member 10 is retained in the recess for the purpose of protecting the handle from environmental pollutants. The handle member 10 is hidden from view, so does not detract from the external aesthetics of the vehicle 1 when the cover 8 is in the closed position.

FIG. 2A to 2C depict the operation of the handle assembly 4 and the tailgate 2 in successive stages of opening. FIG. 2A shows the cover 8 in an open position, the handle member 10 being released from the recess 6. The cover 8 may be maintained in the first open position by way of a detent mechanism configured to stop the cover from fully opening when the tailgate 2 is in the closed position. When the cover 8 is in the open position, the handle assembly 4 presents the user with a clean handle member 10 for the purpose of opening and closing the tailgate 2.

Figure 3:
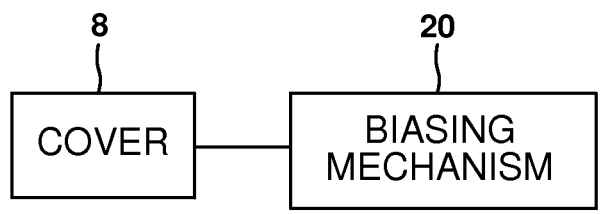
FIG. 3 is a block diagram illustrating the operative connection between the cover and a biasing mechanism.
Figure 4:
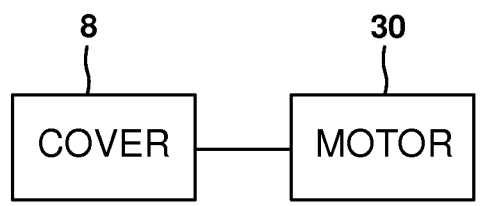
FIG. 4 is a block diagram of an alternative embodiment illustrating the operative connection between the cover and a motor that opens and closes the cover.

The cover 8 may be operated manually, by way of a biasing mechanism 20 (e.g. a sprung mechanism) which may bias the cover away from the recess and/or a retaining mechanism which holds the cover shut (see FIG. 3). Additionally and/or alternatively, the cover 8 may be actuated by a motor 30 (see FIG. 4). Such a biasing mechanism 20 and/or a motor 30 may be activated remotely (e.g. by way of an electronic key fob).

The handle member 10 may be configured to de-latch the tailgate 2 by way of a mechanical linkage or by operation of a switch. Alternatively, the tailgate 2 may be de-latched upon the remote activation of the cover 8.

The cover 8 may be configured to pivot about the tailgate 2 as the user opens/closes the tailgate 2. The cover 8 may pivot under the action of gravity and/or may be biased and/or actuated by a motor. FIG. 2B shows the tailgate 2 in an intermediate position with the cover 8 in a further open position. FIG. 2C shows the tailgate 2 in the fully-open position with the cover 8 in an even further open position. When the tailgate is in the fully-open position, the handle member 10 is accessible to the user for the purpose of closing the tailgate 2.

The cover 8 is movable by any degree that the geometry of the vehicle 1 and/or handle assembly 4 permit and the movement is not limited to that depicted in FIGS. 2A-C. Indeed, the degree by which the cover 8 can move may be selectable/adjustable. Likewise, the degree by which the handle member can move is selectable/adjustable. For example, the degree by which the cover 8 and the handle member 10 can move may be selected/adjusted to accommodate the requirements of an individual user.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A handle assembly for opening and closing a vehicle door wherein the handle assembly comprises:
    a recess in an exterior surface of the vehicle door;
    a cover over the recess wherein the cover is coupled to the vehicle door and is moveable between an open position and a closed position, wherein the cover is actuated by a biasing mechanism;
    a seal between the exterior surface of the vehicle door and the cover; and a handle member coupled to the cover and retained in the recess when the cover is in the closed position and released from the recess when the cover is in the open position;
    wherein the handle member is configured to de-latch the vehicle door.

2. A handle assembly according to claim 1, wherein the cover is pivotably coupled to the vehicle door.

3. A handle assembly according to claim 1, wherein the cover pivots and/or slides by a selectable degree.

4. A handle assembly according to claim 1, wherein the cover is a vehicle registration plate.

5. A handle assembly according to claim 1, wherein the biasing mechanism is activated remotely.

6. A handle assembly according to claim 1, wherein the cover is coupled to the exterior surface of the vehicle door.

7. A vehicle having a handle assembly according to claim 1.

* * * * *